(12) United States Patent
Sankar et al.

(10) Patent No.: US 9,509,459 B2
(45) Date of Patent: Nov. 29, 2016

(54) INTERCELL INTERFERENCE MITIGATION

(71) Applicant: Wi-LAN Inc., Ottawa (CA)

(72) Inventors: Hari Sankar, San Diego, CA (US);
Ron Porat, San Diego, CA (US);
Danjie Pan, Tustin, CA (US); Wee Peng Goh, Temecula, CA (US);
Srikanth Gummadi, San Diego, CA (US); Lei Wang, San Diego, CA (US)

(73) Assignee: Wi-LAN Inc., Ontario (CA)

( * ) Notice: Subject to any disclaimer, the term of this patent is extended or adjusted under 35 U.S.C. 154(b) by 180 days.

(21) Appl. No.: 14/099,255

(22) Filed: Dec. 6, 2013

(65) Prior Publication Data
US 2014/0092882 A1    Apr. 3, 2014

Related U.S. Application Data

(63) Continuation of application No. 13/472,040, filed on May 15, 2012, now Pat. No. 8,626,072, which is a continuation of application No. 12/327,732, filed on Dec. 3, 2008, now Pat. No. 8,204,442.

(60) Provisional application No. 60/992,237, filed on Dec. 4, 2007, provisional application No. 61/029,258, filed on Feb. 15, 2008.

(51) Int. Cl.
*H04L 5/00* (2006.01)
*H04L 25/02* (2006.01)
*H04W 72/08* (2009.01)
(Continued)

(52) U.S. Cl.
CPC ........... *H04L 5/0032* (2013.01); *H04L 5/0007* (2013.01); *H04L 5/0037* (2013.01); *H04L 5/0062* (2013.01); *H04L 5/0066* (2013.01); *H04L 25/0204* (2013.01);
(Continued)

(58) Field of Classification Search
None
See application file for complete search history.

(56) References Cited

U.S. PATENT DOCUMENTS 7,031,742 B2   4/2006  Chen et al.
7,155,236 B2   12/2006 Chen et al.
(Continued)

OTHER PUBLICATIONS

Xiang et al., "Inter-cell Interference Mitigation through Flexible Resource Reuse in OFDMA based Communication Network," Proceedings of the 2nd International Conference on Ubiquitous Information Management and Communication, pp. 169-174 (2008).
(Continued)

*Primary Examiner* — Yemane Mesfin
*Assistant Examiner* — Peter Chen
(74) *Attorney, Agent, or Firm* — Volpe and Koenig, P.C.

(57) ABSTRACT

Methods and apparatus are described for mitigating intercell interference in wireless communication systems utilizing substantially the same operating frequency band across multiple neighboring coverage areas. The operating frequency band may be shared across multiple neighboring or otherwise adjacent cells, such as in a frequency reuse one configuration. The wireless communication system can synchronize one or more resource allocation regions or zones across the multiple base stations, and can coordinate a permutation type within each resource allocation zone. The base stations can coordinate a pilot configuration in each of a plurality of coordinated resource allocation regions. Subscriber stations can be assigned resources in a coordinated resource allocation region based on interference levels. A subscriber station can determine a channel estimate for each of multiple base stations in the coordinated resource allocation region to mitigate interference.

9 Claims, 6 Drawing Sheets

(51) Int. Cl.
*H04W 72/04* (2009.01)
*H04L 1/00* (2006.01)

(52) U.S. Cl.
CPC ......... *H04W 72/082* (2013.01); *H04L 1/0026* (2013.01); *H04W 72/0406* (2013.01); *H04W 72/048* (2013.01)

(56) References Cited

U.S. PATENT DOCUMENTS

| | | | |
|---|---|---|---|
| 7,573,851 B2 | 8/2009 | Xing et al. | |
| 7,602,843 B2* | 10/2009 | Cho | H04L 1/0026 375/220 |
| 7,924,794 B2* | 4/2011 | Ballarini | H04W 8/02 370/338 |
| 8,023,466 B2 | 9/2011 | Ma et al. | |
| 2005/0232195 A1 | 10/2005 | Jones | |
| 2006/0148408 A1* | 7/2006 | Cho | H04L 5/023 455/67.7 |
| 2007/0223606 A1* | 9/2007 | Yang | H04B 7/022 375/260 |
| 2008/0101307 A1* | 5/2008 | Sindhushayana | H04W 52/346 370/337 |
| 2009/0185521 A1 | 7/2009 | Li et al. | |
| 2009/0197538 A1 | 8/2009 | Borran et al. | |
| 2010/0080180 A1* | 4/2010 | Tortora | H04W 72/0426 370/329 |
| 2010/0150079 A1 | 6/2010 | Maltsev et al. | |
| 2010/0220683 A1* | 9/2010 | Novak | H04L 5/0044 370/330 |
| 2010/0222063 A1 | 9/2010 | Ishikura et al. | |

OTHER PUBLICATIONS

Won et al., "Inter-cell Interference Coordination/Avoidance for Frequency Reuse by Resource Scheduling in an OFDM-based Cellular System," IEEE Vehicular Technology Conference, pp. 1722-1725 (Sep. 30-Oct. 3, 2007).

Draft Standard for Local and metropolitan networks; Part 16: Air Interface for Broadband Wireless Access Systems, P802.16Rev2/D2 (Dec. 2007).

* cited by examiner

INTERCELL INTERFERENCE MITIGATION

CROSS-REFERENCE TO RELATED APPLICATIONS

This application is a continuation of U.S. patent application Ser. No. 13/472,040, filed May 15, 2012, which is a continuation of U.S. patent application Ser. No. 12/327,732, filed Dec. 3, 2008, which issued as U.S. Pat. No. 8,204,442 on Jun. 19, 2012, which claims the benefit of U.S. Provisional Application No. 60/992,237, filed Dec. 4, 2007, and claims the benefit of U.S. Provisional Application No. 61/029,258, filed Feb. 15, 2008, which are both incorporated by reference herein as if fully set forth.

BACKGROUND

I. Technical Field

This disclosure relates to the field of wireless communications. More particularly, the disclosure relates to intercell interference mitigation.

II. Related Art

Wireless communication systems are continually seeking to optimize system performance while decreasing interference. The capacity of a wireless communication system can be improved by fully utilizing the available operating bandwidth. In cellular-type wireless communication systems, each cell is typically configured to operate in a predetermined operating band. Frequency reuse refers to the ability of a system to assign the same operating band to multiple cells, sectors, or other defined coverage areas. A maximum utilization of the available operating band implements a frequency reuse of one, where every cell operates over the same operating band. However, transmissions within a given cell often contribute to interference experienced by users in adjacent or overlapping cells, particularly contributing to the interference in those overlapping coverage areas occupying the same frequency spectrum. Many cellular-type wireless communication systems implement a frequency reuse plan that does not fully utilize operating bandwidth in each cell in order to reduce intercell interference. For example, more sparsely populated spectrum reuse schemes may implement a frequency reuse of three or frequency reuse of six. However, the inability to utilize the complete operating band limits system capacity and does not eliminate the possibility of inter-system sources of interference.

BRIEF SUMMARY

Methods and apparatus are described for mitigating intercell interference in wireless communication systems utilizing substantially the same operating frequency band. The operating frequency band may be shared across multiple neighboring or otherwise adjacent cells, such as in a frequency reuse one configuration. The wireless communication system can synchronize one or more resource allocation zones across the multiple base stations, and can coordinate a permutation type within each resource allocation zone. The permutation type for each resource allocation zone can be selected from a group of predetermined types. In the wireless communication system, channel information can be estimated from all synchronized base stations. In one specific embodiment, each base station can transmit or otherwise communicate a pseudo random binary sequence or identifier and a permutation base for each of the resource allocation zones such that the other synchronized base stations, as well as subscriber stations may be aware of the information. Neighboring base stations may share a resource allocation map, such as a subchannel bit map to facilitate coordination of subchannel allocations.

In one aspect, the disclosure includes a method of intercell interference mitigation. The method includes synchronizing a downlink resource allocation zone across a plurality of base stations, coordinating a same resource permutation type across the plurality of base stations in the downlink resource allocation zone, and allocating downlink resources to a subscriber station in the downlink resource allocation zone.

In another aspect, the disclosure includes a method of intercell interference mitigation. The method includes coordinating a pilot configuration within a coordinated downlink allocation region for a serving base station and each of a plurality of neighboring base stations, determining a neighbor list identifying each of the plurality of neighboring base stations, and broadcasting, by the serving base station, pilot data for the pilot configuration and the neighbor list to at least one subscriber station within a coverage area of the serving base station.

In another aspect, the disclosure includes a method of intercell interference mitigation. The method includes receiving, at a base station, a channel quality indicator value from a subscriber station, analyzing the channel quality indicator value, determining a selected resource allocation region in a communication time frame from a plurality of resource allocation regions that includes at least one coordinated downlink resource allocation region, and assigning the subscriber station to the selected resource allocation region.

In another aspect, the disclosure includes a method of intercell interference mitigation. The method includes classifying a subscriber station as interference limited, and allocating a downlink resource to the subscriber station within a coordinated resource zone of a downlink subframe.

In another aspect, the disclosure includes a method of intercell interference mitigation. The method includes receiving over the air signaling messages from each of a plurality of base stations coordinated across a coordinated downlink zone, receiving a downlink resource allocation in the coordinated downlink zone, generating a channel estimate for each of the plurality of base stations based at least in part on the over the air signaling messages, receiving signals in the downlink resource allocation, and decoding the signals in the downlink resource allocation with interference mitigation based on the channel estimate for each of the plurality of base stations.

In another aspect, the disclosure includes a base station configured for interference mitigation. The base station includes an administrative manager configured to coordinate at least one downlink resource allocation region within a communication time frame with a neighboring base station, a subscriber station capabilities monitor configured to store capabilities of at least one subscriber station within a coverage area of the base station, a coordinated downlink zone manager configured to determine a resource allocation region from a plurality of resource allocation regions for a subscriber station based at least in part on capabilities of the subscriber station stored in the subscriber station capabilities monitor, and a scheduler configured to schedule information for the subscriber station in the resource allocation region.

In another aspect, the disclosure includes a subscriber station configured for interference mitigation. The subscriber station includes a channel estimator configured to determine a channel estimate for each of a plurality of base stations having coordinated pilot configuration in a coordinated downlink zone, and an interference canceller configured to mitigate interference within information received within the coordinated downlink zone based on the channel estimates.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION

Figure 1:
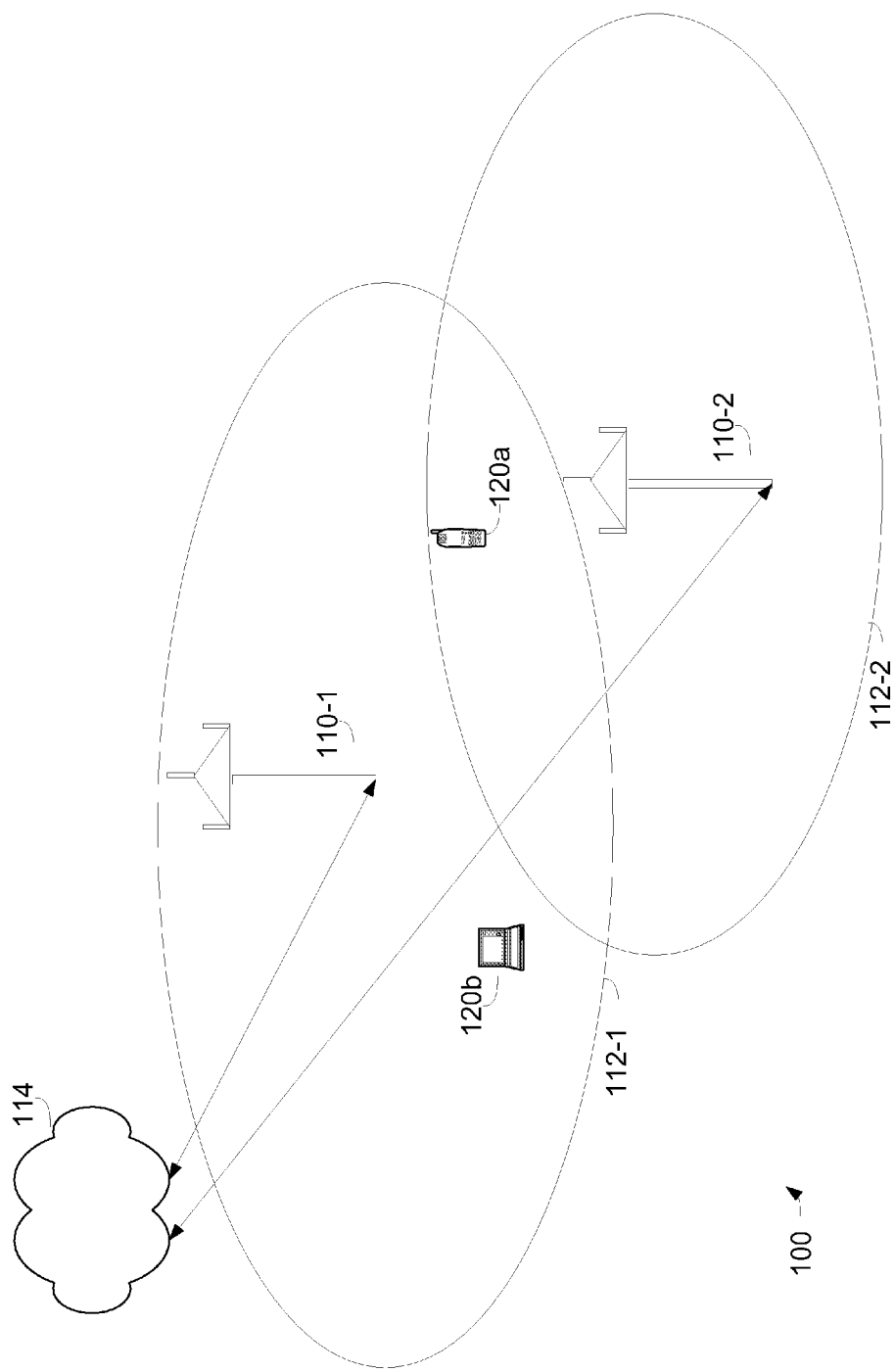
FIG. 1 is a simplified functional block diagram of an embodiment of a wireless communication system.

Methods and apparatus for intercell interference mitigation are described herein. The methods and apparatus may be applicable to several different types of wireless communication systems that are cell-based or otherwise service area-based. Without limiting the generality, the methods and apparatus for intercell interference mitigation can be applied to an Orthogonal Frequency Division Multiple Access (OFDMA) wireless communication system. Further, specific proposed changes to an OFDMA wireless standard, IEEE 802.16 Rev 2/D2, hereby incorporated by reference herein in its entirety, are provided to enable the intercell interference mitigation methods and apparatus described herein to be implemented within an existing wireless system.

Although the methods and apparatus described herein are presented in the context to an OFDMA wireless communication system, and in particular a wireless communication system operating in accordance with an IEEE802.16 standard, the intercell interference methods and apparatus are not limited to application in such a system, and may be applicable to other wireless communication systems. For example, the methods and apparatus for interference mitigation described herein may be applicable to wireless systems such as, but not limited to, Long Term Evolution (LTE), Wireless Local Area Networks (WLAN), Digital Video Broadcasting (DVB), and the like. The examples described herein are described in the context of multi-carrier systems, such as Orthogonal Frequency Division Multiplexed (OFDM) systems, but the disclosure is not limited to application in OFDM systems. Furthermore, the methods and apparatus described herein utilize at least two dimensions for resource allocations (time and frequency). The embodiments described herein, however, are not limited to any particular number of dimensions, but are applicable to any number of resource allocation dimensions.

Enabling frequency reuse-1 is very important for a wide adoption of 802.16e OFDMA PHY (orthogonal frequency division multiple access physical layer) based systems, as spectrum efficiency is one important performance measure for competing wireless technologies. Intercell interference has been identified as a major problem for effectively achieving frequency reuse-1. Therefore, managing interference becomes one of the most important elements to improve the system performance and hence competitive advantage of 802.16e based systems. However, the interference mitigation methods and apparatus described herein are not limited to application in a wireless communication system implementing frequency reuse-1, but is also applicable to other frequency reuse implementations, such as frequency reuse-3, frequency reuse-6, or some other frequency reuse plan.

Interference management can be achieved by a combination of interference avoidance and interference cancellation techniques. Most interference mitigation techniques are based on the knowledge of the interference properties. However, the current 802.16e specification does not provide adequate support for making the interference property knowledge available for effective implementations of interference mitigation schemes. The techniques, methods, and apparatus described herein can be implemented in an 802.16 system with a few minor and backward compatible changes into the 802.16 Rev2/D3 standard that will provide adequate support to aid interference mitigation schemes for the OFDMA PHY based systems.

Base station signaling and coordination of resource allocation can be used to reduce downlink interference and to facilitate downlink interference mitigation techniques implemented within a subscriber station. The base station may assign uplink resources to subscriber stations based on an interference classification in order to reduce the potential for uplink interference and to improve uplink throughput, especially in interference limited scenarios.

The subscriber station may implement interference mitigation techniques on the downlink signals based on knowledge of the downlink signaling characteristics. For example, the subscriber station can be configured to estimate the channel characteristics for a predetermined number of communication channels and utilize the channel characteristics that are estimated for interference channels to mitigate the effects of interference on the received signals.

FIG. 1 is a simplified functional block diagram of an embodiment of a wireless communication system 100. The wireless communication system 100 includes a plurality of base stations, 110-1 and 110-2 coupled to a network 114, such as a wide area network. Each base station, e.g. 110-1, services devices within its respective coverage area, e.g., 112-1, sometimes referred to as a cell.

A first base station 110-1 serves a first coverage area 112-1 and a second base station 110-2 serves a corresponding second coverage area 112-2. The base stations 110-1 and 110-2 are depicted as adjacent or otherwise neighboring base stations for the purposes of discussion. Similarly, the coverage areas 112-1 and 112-2 are shown as overlapping in order to facilitate the description of intercell interference and intercell interference mitigation.

The depiction of the first and second base stations 110-1 and 110-2 and their respective coverage areas 112-1 and 112-2 as adjacent or otherwise overlapping is provided to facilitate discussion of interference. Of course, the second base station 110-2 need not be adjacent the first base station 110-1 in order for their respective coverage areas 112-1 and 112-2 to overlap. Additionally, the coverage areas 112-1 and 112-2 need not overlap in order for signals from one of the base stations, e.g. 110-2, to operate as a source of interference for signals transmitted or received by another base station, e.g. 110-1.

The first and second base stations 110-1 and 110-2 can be configured using a reuse-1 frequency reuse plan, or some other frequency reuse plan, that results in the two base stations 110-1 and 110-2 utilizing the same or at least a portion of the same operating band. Although emissions from a first wireless device always present some type of interference to neighboring devices, the interference is particularly troublesome in wireless communication systems that rely at least partially on frequency selectivity for channelization of communications. The wireless devices may not have sufficient capabilities to distinguish multiple communications within the same frequency channel, and thus interference within the operating frequency band may significantly diminish signal quality.

As an example, the base stations 110-1 and 110-2 serve those devices within the respective coverage areas 112-1 and 112-2. As shown in FIG. 1, first and second client stations or subscriber stations 120a and 120b are within the first coverage area 112-1 and can be supported by the first base station 110-1.

In the example where the wireless communication system is configured with a frequency reuse-1, both the first base station 110-1 and the second base station 110-2 operate over substantially the same operating band. Thus, a wireless device, such as the first subscriber station 120a operating in an overlapping coverage area, experiences interference as a result of transmissions by the second base station 110-2 on the same frequency.

The wireless communication system 100 can mitigate the effects of intercell interference by establishing one or more coordinated downlink (DL) zones. Each coordinated DL zone is a portion of the downlink resources (in the direction from base station to subscriber station) that is coordinated across multiple base stations. The neighboring base stations may have predetermined coordinated DL zones and may be able to dynamically define additional coordinated DL zones, as needed.

The term "zone," as used herein, refers to a logical portion of the signal and does not refer to a physical area or geographic area. The zone may represent a portion of available resources. For example, in a WiMax wireless communication system that operates in accordance with IEEE 802.16 standard, the available resources include time, frequency, space, power, or some combination thereof. A coordinated DL zone may coordinate a logical portion of any one or more of the available resources.

Furthermore, although the term "zone" is used in a manner consistent with the usage in a WiMax wireless communication system, the term "zone" is not limited to use in a WiMax configuration, but instead, refers to any logical partition of resources. Thus, the term "zone" is used consistently with the terms "region," "partition," "allocation space," "subframe portion," "packet," "division," and the like, used to convey the partitioning and allocation of resources according to distinct increments.

In one embodiment, a base station 110-1 can determine a level of interference experienced by a subscriber station, e.g. 120a, and allocate downlink resources in the coordinated downlink zone to the subscriber station for communicating the downlink information based on the level of interference. In one embodiment, the base station 110-1 can determine the level of interference based on a feedback interference metric value communicated from the subscriber station 120a to the base station 110-1 or otherwise determined from one or more metrics communicated from the subscriber station 120a to the base station 110.

For example, the base station 110-1 can be configured to receive a channel quality indicator (CQI) value from each of the subscriber stations 120a and 120b, for which it is the serving base station. The base station 110-1 can perform interference analysis based in part on the received CQI values. The base station can 110-1 perform interference analysis by comparing particular CQI values against thresholds associated with the CQI type. The different CQI types can include, for example, Signal to Interference Ratio (SIR), Interference to Noise Ratio (INR), Carrier to Interference Ratio (CIR), and the like.

The base station 110-1 can, for example, compare a SIR CQI value against a first threshold and determine that an interference condition exists if the SIR value does not exceed the threshold value. Similarly, the base station 110-1 can compare an INR CQI value against a second threshold and determine that an interference condition exists if the INR value exceeds the threshold value. In another embodiment, the base station 110-1 can perform interference analysis based on a plurality of CQI values corresponding to a plurality of CQI types. For example, the base station 110-1 may receive a SIR CQI value and a INR CQI value from a subscriber station and can determine that an interference condition exists if the SIR value does not exceed a first threshold value and the INR value exceeds a second threshold value.

The base station 110-1 may operate on each CQI value individually, or may further process the received CQI values. The base station 110-1 can, for example, filter the received CQI values by determining an average, moving average, weighted average, windowed filter, and the like, on received CQI values.

In another embodiment, one or more of the coordinated downlink zones represents a Cell Edge Zone (CEZ). The base stations 110-1 and 110-2 can allocate downlink resources within the CEZ to support subscriber stations, e.g. 120a, that are determined to be at the edges of a cell. A base station, e.g. 110-1, can determine if a subscriber station, e.g. 120a, is at an edge of a cell or coverage area 112-1, and can allocate downlink resources within the CEZ based on the determination. A subscriber station, e.g. 120a, at a cell edge can be presumed to be exposed to a greater level of interference due to a closer proximity to adjacent base stations, e.g. 110-2, that are potential sources of interference.

The coordinated DL zone includes at least a portion of the downlink frequency band that is shared between the two base stations 110-1 and 110-2. In an Orthogonal Frequency Division Multiple Access (OFDMA) system, the downlink resources may be allocated in two dimensions, time and frequency. Thus, a coordinated DL zone in an OFDMA system may be defined in terms of time and frequency. As an example, OFDMA frames may be defined to be a predetermined number of OFDM symbols synchronized within a predetermined period of time. The coordinated DL zone can be defined in terms of the symbol indices and subcarrier indices within the symbols of the OFDMA frame.

The coordinated DL zone may be positioned virtually anywhere in a downlink frame. In some embodiments, the coordinated DL zone can be positioned adjacent in time to an overhead signaling portion of the downlink frame that includes, for example, a broadcast preamble. A subscriber station can determine a channel estimate based in part on the preamble and a temporal proximity of the coordinated DL zone to the preamble can improve the correlation between the channel estimate and the actual channel conditions that exist during the coordinated DL zone.

In the coordinated DL frame, the first and second base stations 110-1 and 110-2 coordinate or otherwise synchronize various parameters. These parameters include, for example, the zone boundaries, a permutation type implemented within the coordinated DL zone, and a modulation scheme used to convey information in the coordinated DL zone. The coordination of the various aspects of the coordinated DL zone may be coordinated in real time through message exchange or feedback. Alternatively, the coordination of the coordinated DL zone across the plurality of base stations need not be performed in real time, but instead, may be established as a configuration parameter.

Additionally, the base stations 110-1 and 110-2 may inhibit or otherwise deactivate certain functionality during the coordinated DL zone. For example, the base stations 110-1 and 110-2 may inhibit or otherwise refrain from MIMO transmission, and may inhibit or otherwise refrain from assigning any dedicated pilot signals in the coordinated DL zone.

A permutation type may refer to a particular algorithm or process for assigning and permuting the subcarriers that are allocated to a particular subscriber station. The permutation type can limit the number of subcarriers that may be assigned and can control a type of coding that is applied to the signals. The subcarriers of a particular permutation type may be scrambled or otherwise permuted according to a permutation scheme that can rely on a permutation base and a pseudorandom binary sequence PRBS. The combination of the permutation type, permutation base, and PRBS can be used to predict or otherwise determine the subcarriers for a particular frame or symbol. The permutation type can be viewed, for example, as a mapping from a logical channel to a physical channel embodied in the OFDMA symbols. Although the permutation type is described in the context of an OFDMA system, the permutation type may represent any type of logical to physical mapping, and the mapping is not limited to application within an OFDMA system. Each base station can communicate its downlink PRBS and a PRBS identification in one or more fields of an overhead message or messages.

Examples of permutation types can include, but are not limited to, PUSC (partial usage of subchannels), STC PUSC (space time coding partial usage of subchannels), AMC (adaptive modulation and coding), STC AMC (space time coding adaptive modulation and coding), and FUSC (full usage of subchannels).

Additionally, the first and second base stations 110-1 and 110-2 may coordinate the resource allocations within the coordinated DL zone. For example, each of the first and second base stations 110-1 and 110-2 can manage or otherwise track resource allocations in the coordinated DL zone by updating a used subchannel bitmap. The first and second base stations 110-1 and 110-2 reduce or otherwise eliminate concurrent usage of the same subchannels or OFDMA subcarriers through the use and maintenance of the used subchannel bitmap.

The first and second base stations 110-1 and 110-2 can operate using one or more coordinated DL zones. Each base station, e.g. 110-1 and 110-2, supporting coordinated DL zones can determine whether a subscribe station within its respective coverage area supports interference mitigation by signal processing of signals within a coordinated DL zone. The first and second base stations 110-1 and 110-2 can assign a subscriber station, e.g. 120a to the coordinated DL zone in order to mitigate the effects of intercell interference. Subscriber stations, such as second subscriber station 120b, not subject to the debilitating effects of intercell interference or not configured to provide interference mitigation of signals within a coordinated DL zone need not be allocated resources within a coordinated DL zone.

Although virtually any subscriber station, e.g. 120a, may benefit from being assigned to a coordinated DL zone when operating in the presence of intercell interference, a subscriber station, e.g. 120a, having intercell interference mitigation capabilities may further benefit by having knowledge of operation in a coordinated DL zone.

The serving base station, e.g. 110-1 can query the first subscriber station 120a for its capabilities. The first base station 110-1 can, for example, send a subscriber station capabilities query to the first subscriber station 120a and based on the response, can configure the DL resource allocation and coordinated DL zone assignment. For example, the first base station 110-1 can query the first subscribe station 120a for resource permutation type capabilities and determine the supported resource permutation type in a subscriber station response to the query. The first base station 110-1 can then allocate to the subscriber station a resource permutation in the coordinated DL zone based on the supported resource permutation type.

In one embodiment of a wireless communication system based in part on IEEE 802.16, a DL zone can be configured as a coordinated DL zone, where the serving base station and one or more neighbor base stations have the same zone boundary, the same zone permutation type e.g., PUSC, STC PUSC, AMC, STC AMC, and FUSC, and the same values for operating parameters, such as "Use All SC" and "Dedicated Pilots." Some systems may permit pilot boosting, where the pilot channels are broadcast at a higher power level. Within a coordinated DL zone, the resource allocation can be configured to have the parameter "boosting" set to 0b000, i.e., not boosted. The inhibiting of boosted pilot channels reduces the likelihood that the subscriber station will generate an inaccurate channel estimate based on boosted pilot signals.

A frame of multiple symbols can have zero, one, or multiple coordinated DL zones. A first PUSC zone can also be configured as a coordinated DL zone. When the first PUSC zone is a coordinated DL zone, the serving base station coordinates with one or more neighbor base stations to have the same zone boundary and use the same "used-subchannel bitmap."

Each base station configured to support a coordinated DL zone with one or more base stations can be configured to coordinate one or more operating parameters within the coordinated DL zone. The coordinated operating parameters can include, for example, the state of a "use all subchannels" parameter as well as the state of a "dedicated pilots" parameter. For a zone defined by the downlink zone information element as a coordinated DL zone, the "use all subchannels" field can be set to the same value for all base stations that are coordinated in the corresponding DL coordinated zones. Similarly, for a zone defined by the downlink zone information element as a coordinated DL zone, the "Dedicated Pilots" field can be set to the same value for all base stations that are coordinated in the corresponding DL coordinated zones.

A serving base station, e.g. 110-1, can allocate available resources in the coordinated DL zone to a subscriber station, e.g. 120a. The serving base station, e.g. 110-1, can verify or otherwise determine that DL resources are available in the coordinated DL zone by referring to a used-subchannel bitmap. The serving base station, e.g. 110-1, can allocate the DL resources in the coordinated DL zone by sending a Downlink Channel Descriptor (DCD) management message of a type and length associated with coordinated DL zone allocations. The fields or values in the DCD management message can be set based on the particular DL resource allocation. The DCD management message can include information for notifying the presence of one or more coordinated DL zones. Different wireless systems may implement similar management messages for communicating this type of information, and the interference mitigation techniques described herein are not limited to resource allocations following any specific type of management message.

Broadcasting the presence and associated timing of one or more coordinated DL zones permits subscriber stations to implement interference mitigation techniques on signals received in the coordinated DL zones. For example, the first base station 110-1 can send a DCD management message having the type, length, and values as set defined in Table 1.

neighboring base stations. The base stations in a wireless system may be identified with an identification number that may not be unique across the entire system. However, the base stations within a neighboring geographic region may be uniquely or otherwise unambiguously identified within the particular geographic region using the numbers. A base station may broadcast the unambiguous identifiers for the neighboring base stations in a neighbor list. The subscriber station can utilize the neighbor list for purposes of handoff and to facilitate acquiring signals from the neighboring base stations.

The broadcast information can include, for example, the value or manner of determining a downlink permutation base (DL_PermBase) for each coordinated DL zone and the value or manner of determining a pseudo random binary sequence identification (PRBS-ID), which is used to by a subscriber station to determine subcarrier numbering. In one

TABLE 1

| Name | Type | Length | Value | PHY Scope |
|---|---|---|---|---|
| DL Coordinated Zone indication | 62 | 1 | Bit#0: the coordinated first DL PUSC zone indication, if set to 1, indicates the first DL PUSC zone is a coordinated zone. If set to 0, indicates the first DL PUSC zone is not a coordinated zone. Bit#1: the coordinated second DL zone indication, if set to 1, indicates the second DL zone is a coordinated zone. If set to 0, indicates the third DL zone does not exist or is not a coordinated zone. Bit#2: the coordinated third DL zone indication, if set to 1, indicates the third DL zone is a coordinated zone. If set to 0, indicates the third DL zone does not exist or is not a coordinated zone. Bit#3: the coordinated fourth DL zone indication, if set to 1, indicates the fourth DL zone is a coordinated zone. If set to 0, indicates the fourth DL zone does not exist or is not a coordinated zone. Bit#4: the coordinated fifth DL zone indication, if set to 1, indicates the fifth DL zone is a coordinated zone. If set to 0, indicates the fifth DL zone does not exist or is not a coordinated zone. Bit#5 DO coordinated STC PUSC zone matrix indicator, if set to 1, indicates Matrix A only in the first DL STC PUSC zone. If set to 0, indicates not Matrix A only. Bit#6 DL coordinated STC AMC zone matrix indicator, if set to 1, indicates Matrix A only in the first DL STC AMC zone. If set to 0, indicates not Matrix A only. Bit#7: reserved | OFDMA |

Each base station configured to support a coordinated DL zone can broadcast additional information that facilitates interference mitigation at subscriber stations. The broadcast information can include a neighbor list, which can identify those neighboring base stations supporting the coordinated DL zones, and can include an unambiguous identifier for the embodiment, the DL_PermBase field shall be set to the five Least Significant Bits (LSBs) of an IDcell value indicated by a frame preamble when the zone defined by a downlink zone information element, e.g. STC_DL_Zone_IE( ), is a coordinated DL zone. The PRBS_ID field can be set to mod (segment number+1, 3) as indicated by the frame preamble when the zone defined by the downlink zone information element is a coordinated DL zone.

The first base station 110-1 is not limited to assigning subscriber stations to coordinated DL zones based on operation within an overlapping portion of the coverage area or operation at a cell edge zone. Instead, the first base station 110-1, and in general any base station supporting the coordinated DL zones, can schedule resources in a coordinated DL zone and can assign a subscriber station to a coordinated DL zone based on a number of parameters. The parameters can include, for example, the base station signal strengths observed at the subscriber station, or some other parameter that may be indicative of intercell interference.

The base station may also implement methods of avoiding uplink interference between subscriber stations. Interference avoidance in the uplink path is different from interference avoidance in the downlink path because a single base station may be configured to concurrently receive uplink signals from a plurality of subscriber stations that may each be positioned virtually anywhere within the coverage area supported by the base station.

In the uplink, the antenna gain differences between boresight and sector edges can be greater than about 10 dB. Thus, interference can be largely determined based on the locations of the desired and interfering subscriber stations. A subscriber station that is farther out but in the boresight of a neighboring base station will be received at a stronger power than a subscriber station that is positioned at a cell edge, but positioned much closer than the subscriber station in the antenna boresight.

Moreover, in some wireless communication systems, such as those operating in accordance with IEEE 802.16, uplink resource allocations are tiled in the frequency domain first. This ordering of resource allocations makes separation of subscriber station allocations in the time domain more difficult. Implementing zone switching in the uplink reduces the power density of the subscriber station transmissions due to the increase in the number of subchannels that are occupied in frequency.

To improve coverage and throughput in the uplink, the base station can identify and separate subscriber stations based on their locations in the coverage area. For example, those subscriber stations at cell edges can be separated from other subscriber stations for the purposes of uplink resource allocations. Furthermore, the types of MIMO and modulation modes assigned to the cell edge subscriber stations may be limited or otherwise controlled.

The base station can divide subscriber stations into a predetermined number of groups. Each subscriber station can be characterized as, for example, one of a cell-edge, sector-edge, or cell-center. The base station can assign orthogonal resources to the different population sets (e.g. cell-edge, sector-edge, or cell-center) so that interference to users within a particular population set is substantially limited to those subscriber stations belonging to the same population set. The orthogonal resources can include, but are not limited to, power, time, space, frequency, or some combination thereof. In one embodiment, the base station can separate the users of the population sets by frequency, and can assign distinct subchannel sets to each of the population sets.

The base station assignment of orthogonal resources to the distinct population sets operates to reduce the uplink interference experienced by different subscriber stations in the same coverage zone, but may not minimize the interference in the uplink of neighboring base stations. The lack of coordination of uplink resource allocation with neighboring base stations may only present interference issues in those wireless communication systems implementing reuse-1. In more sparsely populated reuse schemes, such as reuse-3, the uplink signals are more likely to be noise limited rather than interference limited.

One embodiment to further reduce uplink interference experienced by neighboring base stations is for a base station to limit or otherwise control a modulation coding scheme (MCS) assigned to those subscriber stations in the cell-edge and sector-edge population sets. For example, the base station may limit the MCS of uplink resource allocations to MCS types that minimize a rise-over-thermal noise contribution (referred to as 'IoT') experienced at neighboring base stations. Optimally, the serving base station would know or estimate the path loss difference between the serving base station and the strongest interferer in order to assign a MCS to minimize IoT experienced at the neighboring base stations. In the absence of path loss knowledge, the serving base station can estimate the strongest interferer based on a metric, such as a preamble carrier-to-interference and noise (CINR) value or some other Channel Quality Indicator that may be reported to the base station. To further reduce the possibility of uplink interference, each base station should coordinate its ranging opportunities with the neighboring base stations.

Figure 2:
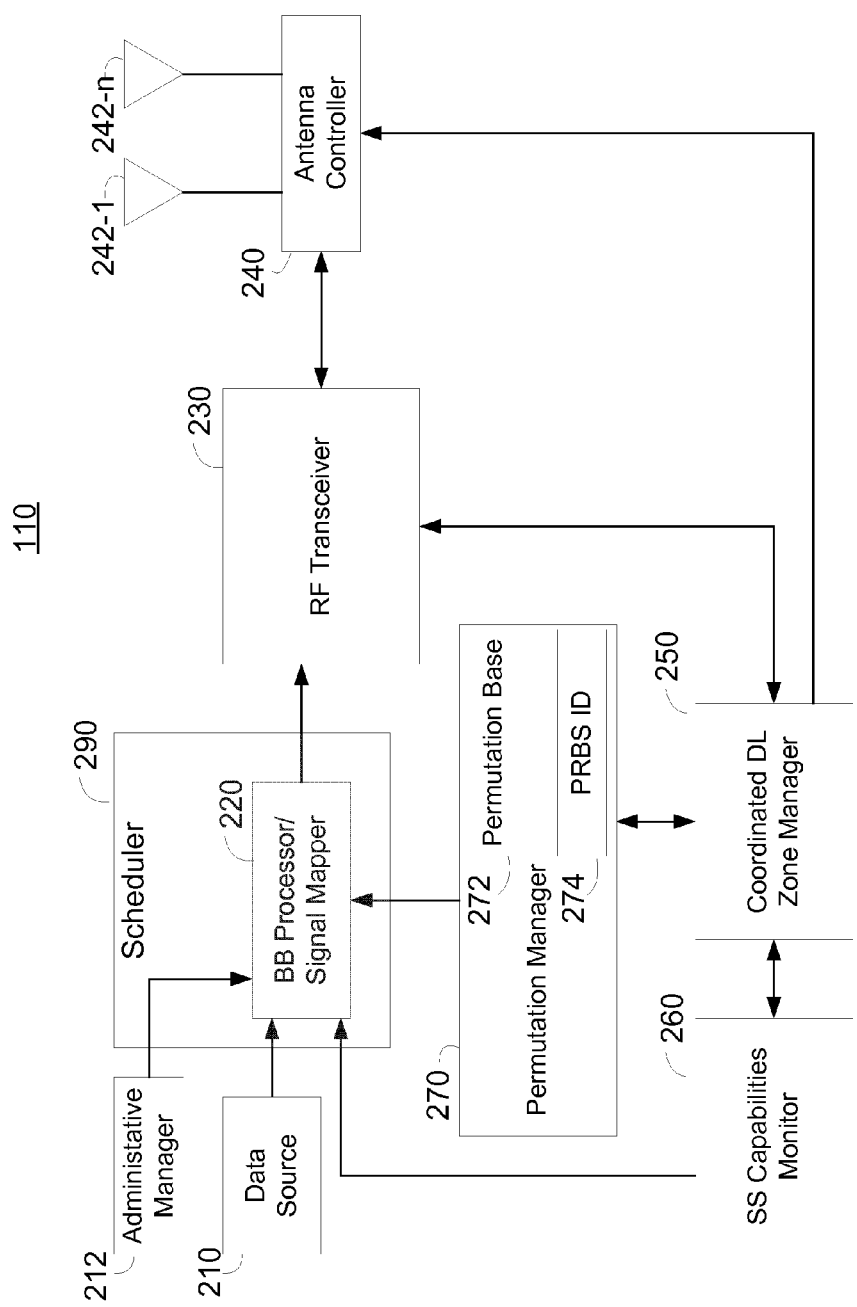
FIG. 2 is a simplified functional block diagram of an embodiment of a base station.

FIG. 2 is a simplified functional block diagram of an embodiment of a base station 110. The base station can be, for example, the first or second base station 110-1 or 110-2, respectively, shown in the wireless communication system of FIG. 1. The base station 110 includes the capabilities to configure and support one or more coordinated DL zones with neighboring base stations. The base station 110 functionality is simplified to include those portions that operate as part of intercell interference mitigation. Other portions of the base station 110 are omitted for the purposes of brevity and clarity.

The base station 110 includes a transmit or downlink processing path and a receive or uplink processing path. The downlink processing path includes a data source 210 that can be configured to generate or otherwise interface with a data generator. The data source 210 is coupled to a scheduler 290 that includes a downlink baseband processor 220 that also functions as a signal mapper. An administrative manager 212 can coordinate the coordinated DL zones with the neighboring base stations. For example, the administrative manager 212 can coordinate the pilot configuration across the multiple coordinated base stations. The administrative manager 212 can store or otherwise access an external subchannel bit map (not shown) used when allocating resources in a coordinated DL zone. The administrative manager 212 can, for example, store the identities of the neighboring base stations in a neighbor list. The administrative manager 212 can couple the neighbor list to the scheduler 290 for subsequent broadcast.

The scheduler can also be configured to schedule uplink resources for the subscriber stations in the base station 110 coverage area. The output of the scheduler 290 is coupled to a transmit path of an RF transceiver 230.

The downlink RF signal is coupled to an antenna controller 240 that operates to control a plurality of antennas 242-1 and 242-n in order to implement some type of diversity, such as space time diversity, beamforming, beamsteering, and the like or some other type of antenna signal distribution and control.

In the uplink direction, the uplink signals from the subscriber stations (not shown) are coupled to the antennas 242-1 and 242-*n* via the antenna controller 240 to a receive portion of the RF transceiver 230.

A coordinated DL zone manager 250 is coupled to the RF transceiver 230, a subscriber station capabilities monitor 260, and a permutation manager 270. The permutation manager 270 includes a permutation base storage 272 and a pseudorandom binary sequence ID storage 274. The permutation manager 270 is coupled to the downlink baseband processor 220, for example, to control the signal mapping in the coordinated DL zones.

As described above, the wireless system 100 can be configured to establish one or more coordinated DL zones and synchronize the zones across multiple base stations. Thus, the base station 110 synchronized with a coordinated DL zone can allocate resources to a subscribe station in the coordinated DL zone.

The base station 110 can register a subscriber station, for example, when the subscriber station enters the coverage area supported by the base station 110, and send a query to the subscriber station for its capabilities, including the ability to support the coordinated DL zones, and the permutation types supported by or otherwise enabled in the subscriber station. Specifically, within the base station 110 the coordinated DL zone manager 250 can receive from the subscriber station capabilities monitor 260 a query directed to the subscriber station to determine the subscriber station capabilities.

The base station 110 can receive the response from the subscriber station, and the coordinated DL zone manager 250 can store, update, or otherwise access the subscriber station capabilities, which may be stored, for example, within a look up table in the subscriber station capabilities monitor 260.

The base station 110 can receive one or more parameters or requests from the subscriber station that indicate a desire or advantage for assigning the subscriber station to a coordinated DL zone. The subscriber station may make an express request or the desire to transition a subscriber station to a selected coordinated DL zone may be implicit from one or more messages or information received from the subscriber station. The base station 110 can be configured to receive CQI values from each subscriber station for which it is the serving base station. The coordinated DL zone manager 250 can receive and perform interference analysis on the received CQI values for each subscriber station. The coordinated DL zone manager 250 can establish a coordinated DL zone, in part, by allocating DL resources to the coordinated DL zone sufficient to support a particular permutation scheme controlled by the permutation manager 270.

The coordinated DL zone manager 250 can, for example, configure a particular permutation type supported by the subscriber station, and determine the permutation parameters, including permutation base and PRBS associated with the permutation type. The permutation manager 270 can retrieve a permutation base from a permutation base storage 272 and can determine a PRBS from a PRBS ID storage 274 that can include, for example, the PRBS values and the corresponding PRBS indices identifying the PRBS. The coordinated DL zone manager 250 can generate one or more messages to the subscribe station and neighboring base stations of the coordinated DL zone, including the permutation type, permutation base, and PRBS ID.

The coordinated DL zone manager 250 can initialize a used subchannel bitmap and can update the bitmap as subchannels are allocated to the subscriber stations assigned to the coordinated DL zone. The subchannels can be subchannels assigned by the base station 110 or some other base station (not shown) that is participating in the coordinated DL zone.

The coordinated DL zone manager 250 may also control the operation of one or more other parameters or configurations during the coordinated DL zone. For example, the coordinated DL zone manager 250 may be configured to control the baseband processor 220 to inhibit or otherwise refrain from assigning any dedicated pilots during the coordinated DL zone. Similarly, the coordinated DL zone manager 250 may control the RF transceiver 230 or antenna controller 240 to inhibit or otherwise refrain from implementing MIMO configurations during the coordinated DL zone.

Figure 3:
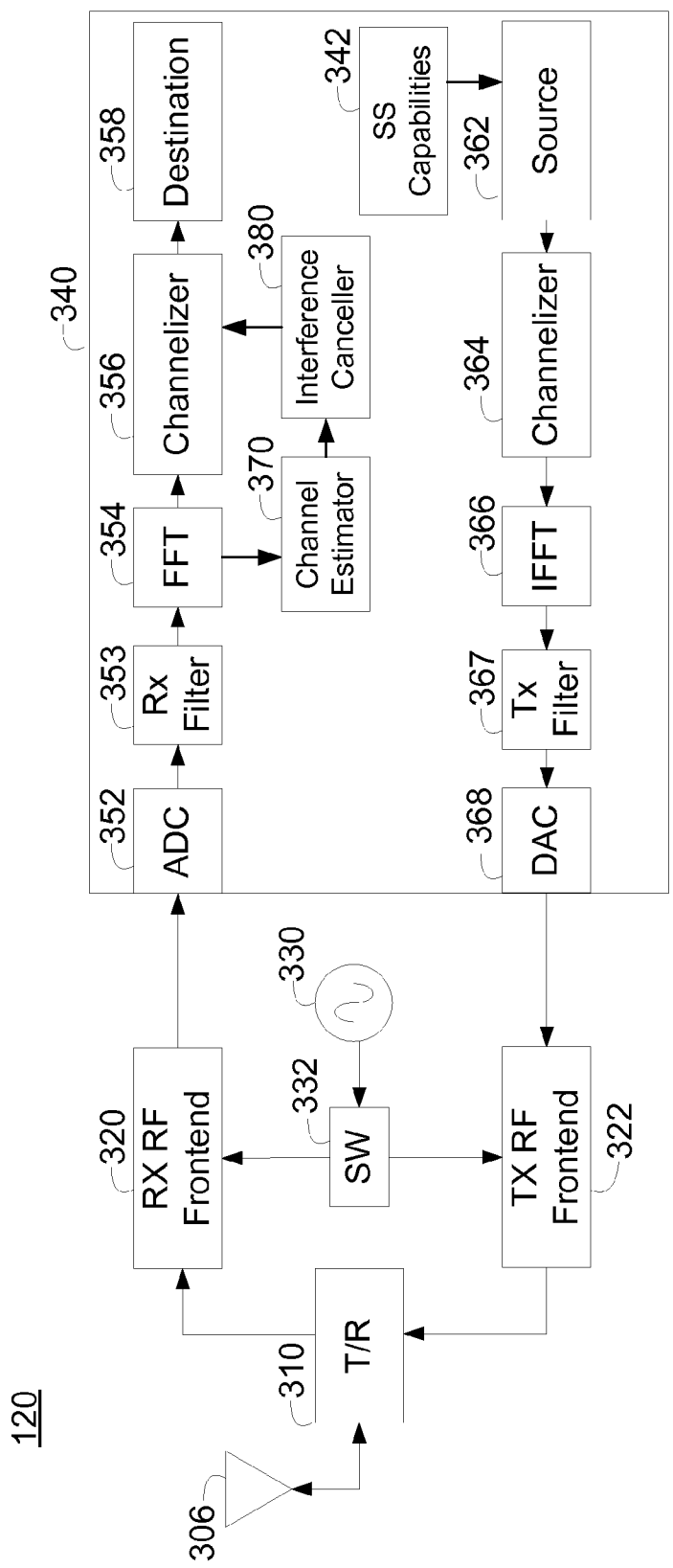
FIG. 3 is a simplified functional block diagram of an embodiment of a subscriber station.

FIG. 3 is a simplified functional block diagram of an embodiment of a subscriber station 120. The subscriber station 120 can be, for example, a subscriber station, e.g., 120*a* or 120*b*, in the wireless communication system of FIG. 1, and can support various permutation types and coordinated DL zones in which the various permutation types may be implemented.

The subscriber station 120 includes an antenna 306 through which the uplink and downlink signals are communicated. The antenna 306 couples the downlink signals to a transmit/receive (T/R) switch 310. The T/R switch 310 operates to couple the downlink signals to the receiver portion of the subscriber station 120 during a downlink subframe and operates to couple uplink signals from the transmitter portion of the subscriber station 120 during an uplink subframe.

During the downlink portion or subframe, the T/R switch 310 couples the downlink signals to a receive RF front end 320. The receive RF front end 320 can be configured, for example, to amplify, frequency convert a desired signal to a baseband signal, and filter the signal. The baseband signal is coupled to a receive input of a baseband processor 340.

The receive input of the baseband processor 340 couples the received baseband signal to an Analog to Digital Converter (ADC) 352 that converts the analog signal to a digital representation. The output of the ADC 352 can be coupled to a transformation module, such as Fast Fourier Transform (FFT) engine 354 that operates to convert the received time domain samples of an OFDM symbol to a corresponding frequency domain representation. The sample period and integration time of the FFT engine 354 can be configured, for example, based upon the downlink frequency bandwidth, symbol rate, subcarrier spacing, as well as the number of subcarriers distributed across the downlink band, or some other parameter or combination of parameters.

The output of the FFT engine 354 can be coupled to a channelizer 356 that can be configured to extract the subcarriers from those symbols that are allocated to the particular subscriber station 120. The channelizer 356 can be configured, for example, with the permutation type, permutation base, and PRBS associated with the coordinated DL zone in which the subscriber station 120 operates. The output of the channelizer 356 can be coupled to a destination module 358. The destination module 358 represents an internal destination or output port to which received data may be routed.

The channelizer 356 can be configured to determine or otherwise generate one or more channel quality indicator values based on the extracted subcarriers and channel estimates provided by the channel estimator 370 or interference canceller 380.

The subscriber station 120 also includes a channel estimator 370 that is coupled to the FFT engine 354 and that can, for example, generate or otherwise determine a channel estimate based on pilot subchannels included in the DL symbols. The channel estimator 370 can be coupled with a permutation manager (not shown) that receives information from neighboring base stations, such as permutation base, PRBS ID, and so forth. In implementation, the permutation manager can be integrated as part of the channel estimator 370. The channel estimator can couple the channel estimates to an interference canceller 380 that operates to cancel, compensate for, or otherwise mitigate the effects of intercell interference.

The interference canceller 380 can, for example, provide the channel estimates to the channelizer 356 to permit the channelizer to cancel the noise and interference contribution from the non-serving base stations. Alternatively, the interference canceller 380 can modify or otherwise contribute to a decoder operation within the channelizer 356.

The uplink path is complementary to the downlink signal path. A source module 362 of the base band processor 340, which may represent an internal data source or an input port, generates or otherwise couples uplink data to the baseband processor 340. A subscriber station capabilities module 342 can be used to store the subscriber station capabilities, and can be configured to generate a message in response to a query for the subscriber station capabilities. The source 362 couples the uplink data to an uplink channelizer 364 that operates to couple the uplink data to appropriate uplink resources that are allocated to support the uplink transmission.

The output of the uplink channelizer 364 is coupled to an IFFT engine 366 that operates to transform the received frequency domain subcarriers to a corresponding time domain OFDM symbol. The uplink IFFT engine 366 may support the same bandwidth and number of subcarriers as supported by the downlink FFT engine 356.

The output of the uplink IFFT engine 366 is coupled to a Digital to Analog Converter (DAC) 368 that converts the digital signal to an analog representation. The analog baseband signal is coupled to a transmit front end 322, where the signal is frequency translated to the desired frequency in the uplink band. The output of the transmit front end 322 is coupled to the T/R switch 310 that operates to couple the uplink signal to the antenna 306 during the uplink subframe.

An LO 330 is coupled to a switch 332 or demultiplexer that selectively couples the LO 330 to one of the receive front end 322 or transmit front end 322 so as to be synchronized to the state of the T/R switch 310.

Figure 4:
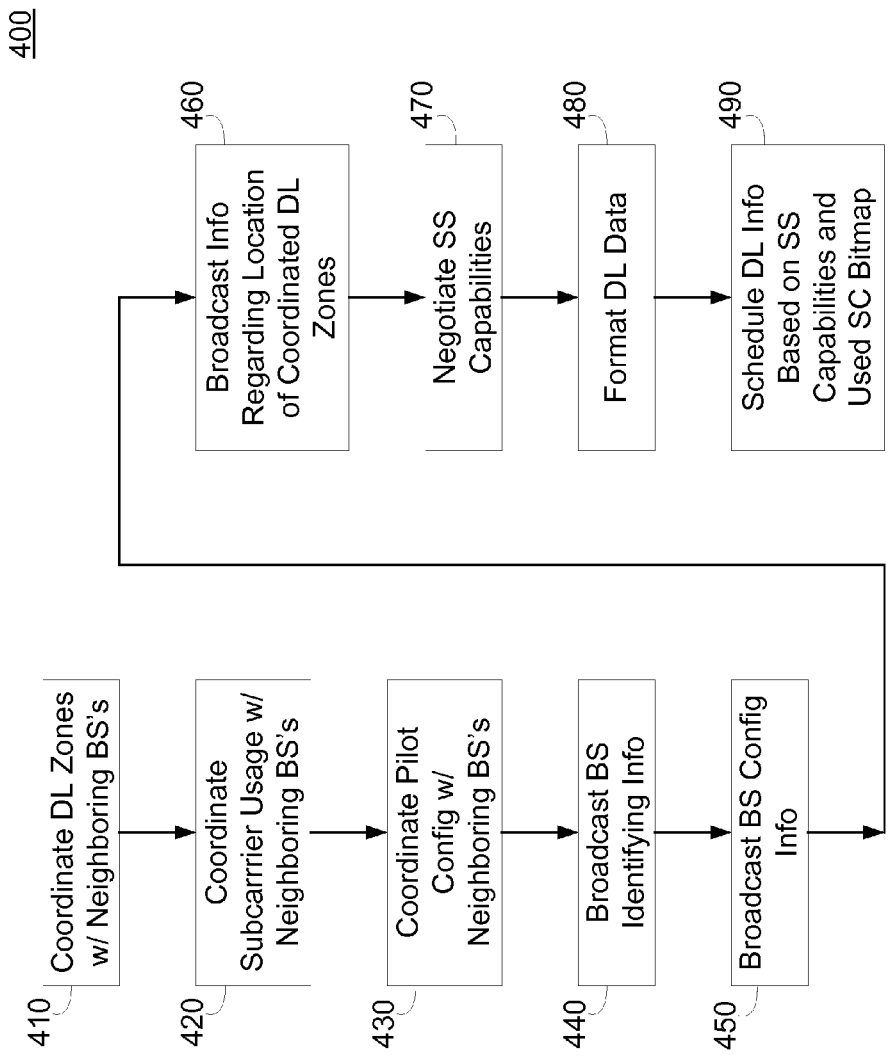
FIG. 4 is a simplified flow chart of an embodiment of a method of communicating using a coordinated downlink zone.

FIG. 4 is a simplified flowchart of a method 400 of communicating using a coordinated downlink zone. The method 400 can be implemented, for example, by a base station of the wireless communication system illustrated in FIG. 1. The method 400 permits the establishment, coordination and signaling associated with a coordinated DL zone, such as a coordinated DL zone in a TDM OFDMA wireless communication system.

The method 400 begins at block 410 where a base station coordinates the existence and location of coordinated DL zone with at least one other base station. Typically, a base station tracks the identities of the neighboring base stations and may establish and maintain a coordinated DL zone with one or more neighboring base station.

The various steps of the method 400 are provided in a logical order to facilitate description of the process of communicating using a coordinated downlink zone. The actual order of the various steps need not follow the logical order, unless the need for such order is apparent from the description.

The base station may coordinate the DL zone by communicating or otherwise coordinating the zone boundaries and zone permutation type with the neighboring base station. In one embodiment, the zone boundaries may be, for example, explicitly established in a control message communicated between the coordinating base stations or may be maintained within each base station as a configuration parameter. Where configuration parameters permit multiple distinct zones, the coordinating base stations may exchange information regarding which of the zones is to be established as a coordinated DL zone.

Alternatively, the zones that are configured as coordinated DL zones may be established network wide, and configured through one or more configuration parameters. In such an embodiment, the existence and location of coordinated DL zones need not be expressly communicated to each of the base stations.

The base station proceeds to block 420 and coordinates the subcarrier usage including the permutation type that is used in each coordinated DL zone. The base station can coordinate all subcarriers are used and the specific permutation type. The permutation type can set forth, for example, the number of subcarriers utilized and type of space time coding utilized for the downlink signals. The permutation type can be selected from, for example, PUSC (partial usage of subchannels), STC PUSC (space time coding partial usage of subchannels), AMC (adaptive modulation and coding), STC AMC (space time coding adaptive modulation and coding), and FUSC (full usage of subchannels). The permutation type can be coordinated between the base stations through express message exchange or can be established implicitly, for example, via configuration parameters.

The base station proceeds to block 430 and coordinates the pilot signals used in the coordinated DL zone. In one embodiment, the base station can select between dedicated pilots and non-dedicated pilots (alternatively referred to as broadcast pilots). Each of the base stations coordinated across a coordinated DL zone uses the same pilot signaling type. That is, if a first base station in the coordinated DL zone utilizes dedicated pilots, then a subscribe station can determine that all other base stations configured to support the same coordinated DL zone will also utilize dedicated pilots. The same is true for the converse condition. Where a first base station does not utilize dedicated pilots in the coordinated DL zone, but instead, utilizes broadcast pilots, the other base stations supporting the same coordinated DL zone do not use dedicated pilots and also utilize broadcast pilots.

The base station proceeds to block 440 and broadcasts base station identifying information, for example, in a neighbor list. The base station identifying information can include information used by a subscriber station to identify a particular base station as a source of a signal. Additionally, a subscriber station may utilize the base station identifying information to estimate a channel from the base station. The base station identifying information can include, for example, a downlink permutation base value (DL_Perm-Base) and a pseudo random binary stream identification value (PRBS_ID). This information can be sent, for example, in a Space Time Coding DL Zone Information Element (STC_DL_Zone_IE).

The base station proceeds to block 450 and broadcasts base station configuration information that facilitates interference mitigation by interference mitigation capable subscriber stations. Such information can include, for example, the permutation type, the state of a "use all subchannels" parameter, and the use or absence of dedicated pilots. This information can also be sent, for example, in a Space Time Coding DL Zone Information Element.

The base station proceeds to block 460 and broadcasts information regarding the existence and location of coordinated DL zones. The base station can, for example, broadcast a downlink channel descriptor (DCD) management message that is configured with a type and length associated with conveying information relating to coordinated DL zone allocations. The fields or values in the DCD management message can be set based on the particular DL resource allocation and the particular positions or boundaries of the coordinated DL zones. The DCD management message can include information for notifying the presence of one or more coordinated DL zones.

The base station proceeds to block 470 and negotiates the capabilities of those subscriber stations for which it is the serving base station. The base station can, for example, determine the subscriber station capabilities through a capabilities request and response exchange with the subscriber station. The base station may receive a DL coordinated zone capability message from the subscriber station. The DL coordinated zone capability message from the subscriber station may, for example, be identified by a predetermined type identifier and may have a length of one byte. The state of each of the bits in the message may indicate the ability to support a particular permutation type in a coordinated DL zone. An example of the type, length, and value parameters for such a subscriber capabilities message is provided in Table 2.

TABLE 2

| Name | Type | Length | Value | PHY Scope |
|---|---|---|---|---|
| DL Coordinated Zone Capability | 185 | 1 | Bit#0: Support DL coordinated zone for non-STC PUSC<br>Bit#1: Support DL coordinated zone for STC PUSC if all bursts uses Matrix A<br>Bit#2: Support DL coordinated zone fo STC PUSC<br>Bit#3: Support DL coordinated zone for AMC<br>Bit#4: Support DL coordinated zone for STC AMC if all bursts uses Matrix A<br>Bit#5: Support DL coordinated zone for STC AMC<br>Bit#6: Support DL coordinated zone for FUSC<br>Bit#7: reserved | SBC-REQ |

The base station proceeds to block 480. If the base station is a serving base station for a particular subscriber station within its coverage area, the base station receives the downlink data for the subscriber station. The base station receives the downlink information and formats it for transmission to the subscriber station. The base station can encode and modulate the downlink information. The base station can format the data, for example, based on a signal quality and bandwidth requirements of the subscriber station. The base station may take into account geographic positioning of the subscriber station and levels of interference experienced by the subscriber station in formatting the downlink information for transmission to the subscriber station.

The base station proceeds to block 490 and schedules or otherwise allocates downlink resources to the subscriber station based on the subscriber station capabilities. The base station may selectively allocate resources within a coordinated DL zone if the subscriber station supports such a zone and if the level of interference experienced by the subscriber station warrants such an allocation. The base station may also utilize a used subcarrier bitmap in order to determine availability of subcarriers and times of availability occurring during the coordinated DL zone. The used subcarrier bitmap may be shared among a plurality of base stations.

Coordinating DL zones among multiple base stations permits subscriber stations to perform one or more interference mitigation techniques to improve the quality of the received signals.

Figure 5:
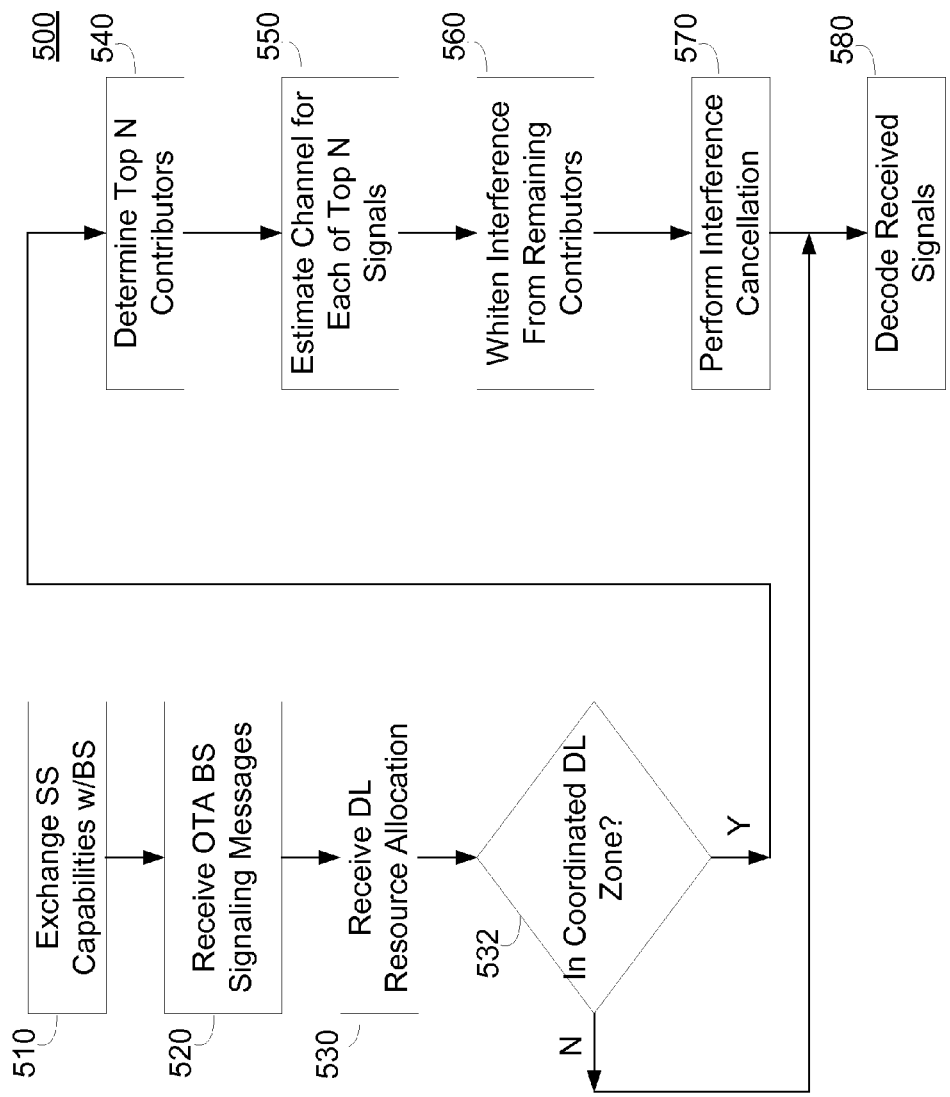
FIG. 5 is a simplified flow chart of an embodiment of a method of processing received signals in a coordinated downlink zone.

FIG. 5 is a simplified flow chart of an embodiment of a method 500 of processing received signals in a coordinated downlink zone. The method 500 can be implemented, for example, in a subscriber station, such as the subscriber station illustrated in FIG. 3 operating in the wireless communication system of FIG. 1.

The method 500 begins at block 510, where the subscriber station exchanges capabilities with the serving base station of the coverage are in which the subscriber station resides. In particular, the subscriber station may signal its ability to support coordinated DL zones. The subscriber station may signal its ability to support coordinated DL zones, for example, during a capabilities exchange with the base station. The subscriber station can be configured to send a type/length/value message identifying coordinated DL zone capabilities. The message can include a type value identifying the message as a coordinated DL capabilities message. The length of the message can be predetermined according to the type, and the values populating the message may indicate the subscriber station capability to support coordinated DL zone with various permutation types.

After exchanging capabilities, the subscriber station proceeds to block 520 and receives over the air (OTA) base station signaling messages. The OTA base station signaling messages can be received from the serving base station as well as one or more additional base stations that may inadvertently operate as interference sources to the subscriber station. The one or more additional base stations will likely be neighbor base stations to the serving base station.

The OTA signaling messages can include, for example, messages that identify a DL permutation base and PRBS_ID for the transmitting base station. The OTA signaling messages can also include a message that indicates the use or lack of use of dedicated pilots, and the state of a use all subchannels field. Furthermore, the OTA signaling messages can include one or more downlink management messages that each identifies the presence and parameters associated with a coordinated DL zone. The parameters may include, for example, the boundaries of the coordinated DL zone and the permutation type utilized within the coordinated DL zone.

The subscriber station proceeds to block 530 and receives a downlink resource allocation. The subscriber station can determine that it has received a downlink resource allocation in any one of a variety of methods generally used in wireless communications. In one embodiment, the subscriber station can receive and decode a downlink MAP message that identifies the downlink resource allocations in a particular frame of data or series of frames of data.

The subscriber station proceeds to decision block 532 and determines if the downlink resource allocation falls within a coordinated DL zone. The subscriber station can, for example, compare the downlink resource allocation to the boundaries of the coordinated DL zones that are reported or that can be determined from the downlink management control messages.

If the downlink resource allocation is not within a coordinated DL zone, the subscriber station proceeds to block 580 and does not implement the interference mitigation techniques of the method 500. If the subscriber station determines that the downlink resource allocation falls within a coordinated DL zone, the subscriber station proceeds to decision block 540.

At block 540, the subscriber station determines the received power of each identifiable signal source, and ranks the signal sources according to received power. The subscriber station then determines a predetermined number, N, of the strongest signal sources for further processing. Ideally, the received signal from the serving base station is included in the strongest signal sources. The number, N, of signals and the number of interferers that are processed is only limited by the subscriber station implementation. In a particular subscriber station embodiment, the number of signals processed for interference mitigation may be limited by a decoder structure utilized for processing signals when not in an interference limited link. For example, a Maximum Likelihood (ML) decoder configured to process two 64-QAM streams can be reconfigured to perform interference mitigation on the desired signal and signals from up to three interferers. In such an implementation, the hardware cost for implementing interference mitigation within the subscriber station is minimized.

The subscriber station proceeds to block 540 and determines a channel estimate for each of the strongest signals. Thus, in the example provided above, the subscriber station estimates the channel for the desired signal and the three strongest interference signals. The subscriber station can utilize the parameters transmitted in the base station OTA messages to perform channel estimation. For example, for each base station signal for which the subscriber station generates a channel estimate, the subscriber station can utilize the DL_PermBase value and PRBS_ID value to estimate the channel based on the preamble broadcast by the base station. The subscriber station can refine the channel estimate derived from the base station preamble based on the pilot signals broadcast by each base station. The subscriber station can perform, for example, an iterative Minimum Mean Squared Error (MMSE) channel estimate for each monitored signal based on the base station preambles and the broadcast pilots.

The broadcast pilots, i.e. non-dedicated pilots, broadcast by each of the base stations supporting the coordinated DL zone purposely collide in time and frequency when the wireless communication system is configured for reuse-1. The subscriber station is able to determine a channel estimate for each of the desired signal and the predetermined number of strongest interference signals based on the coincident pilot signals. Of course, the pilot signals need not be received coincident in time and frequency for the subscriber station to determine a channel estimate.

After determining the channel estimate for each of the desired signal and predetermined number of strongest interference signals, the subscriber station proceeds to block 560. The subscriber station may not have sufficient resources of be configured to estimate the channel for every interferer. For example, the subscriber station described above can estimate the channel for three interferers, but there may be conditions in which there are more than three interferers. The subscriber station can treat the remaining weaker interferers as colored noise. In one embodiment, the subscriber station mitigates the interference contributed by the aggregate of the weaker interferers for which a channel is not estimated by exploiting autocorrelation properties of the interferers. The subscriber station can, for example, modify the noise vector produced by the remaining weaker interferers to remove the colored aspect of the noise and effectively whiten the noise contribution. The subscriber station can utilize a Minimum Mean Squared Error estimate of a compensation vector that whitens the colored noise contributed by the remaining weaker interferers.

The subscriber station proceeds to block 570 and performs interference mitigation or cancellation based on the channel estimates and the whitened noise attributable to the interferers for which a channel estimate was not generated. Interference cancellation can be performed distinct from or as part of the decoding process. If interference cancellation is performed distinct from decoding, the subscriber station proceeds to block 580 following interference cancellation.

At block 580, the subscriber station decodes the desired downlink signal using the interference cancelled signal. Alternatively, the subscriber station can utilize the channel estimates in conjunction with the whitened noise component to decode the received downlink signal. For example, the subscriber station may utilize a maximum likelihood (ML) decoder that uses the channel estimates in conjunction with the whitened noise component to decode the received downlink signal. By using the channel estimates determined from the strongest coordinated base stations that contribute as interferers and the whitened noise from the remaining weaker base station interferers, the subscriber station is able to perform interference cancellation on a greater number of interferers than is possible based on interference cancellation based on weighting of different signals received via distinct antennas. That is, the interference cancellation technique described in the method 500 of FIG. 5 has more degrees of freedom than are available in a weighted combination of antenna signals.

Figure 6:
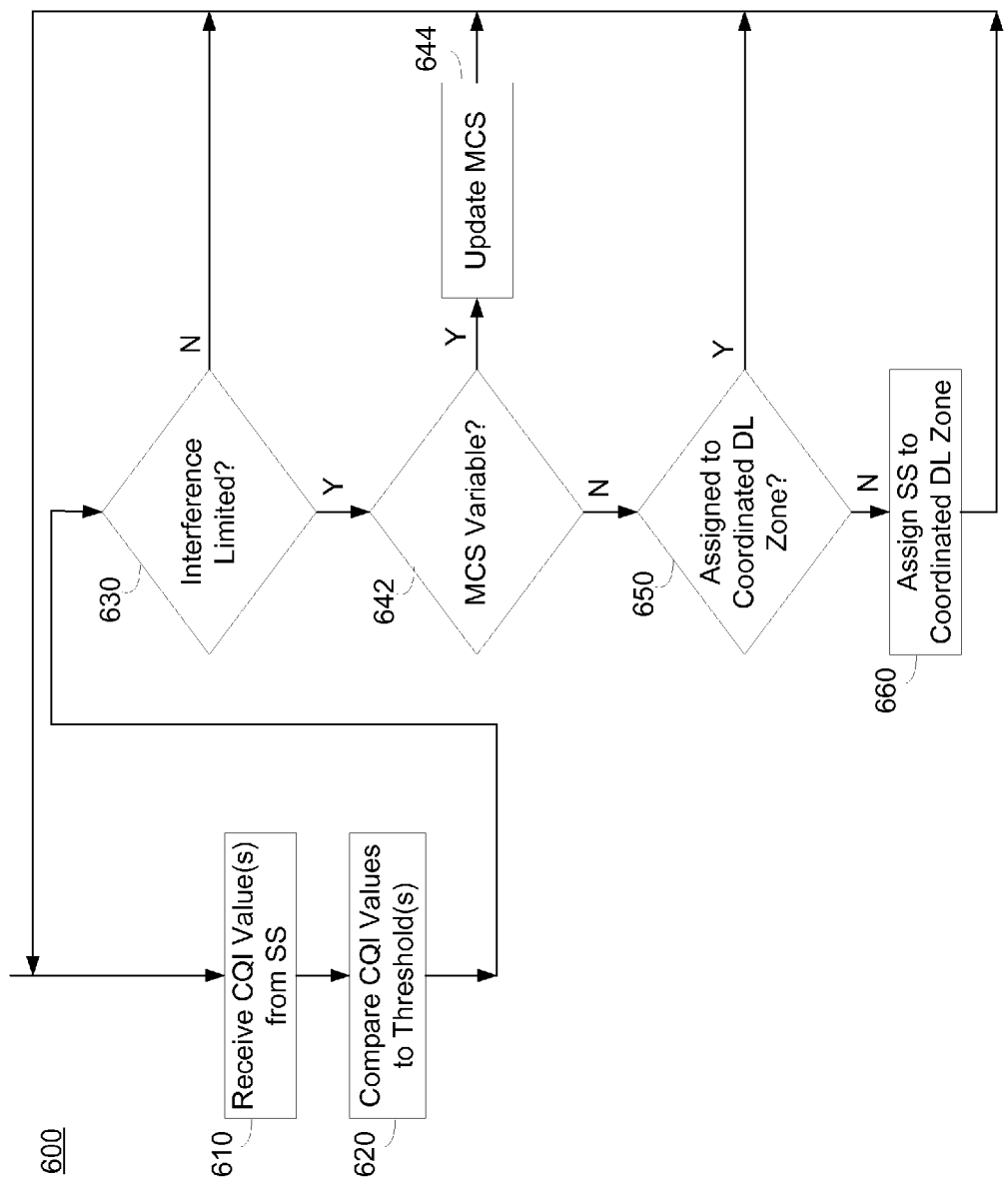
FIG. 6 is a simplified flow chart of an embodiment of a method of determining a downlink resource allocation zone.

FIG. 6 is a simplified flow chart of an embodiment of a method 600 of determining a downlink resource allocation zone. The method 600 may be implemented, for example, within a base station, such as a base station of FIG. 1 or the base station of FIG. 2.

The method 600 begins at block 610 where a serving base station receives one or more Channel Quality Indicator (CQI) values corresponding to one or more CQI types from a subscriber station for which the base station is the serving base station. The different CQI type can include, for example, Signal to Interference Ratio (SIR), Interference to Noise Ratio (INR), Carrier to Interference Ratio (CIR), Carrier to Interference and Noise Ratio (CINR) and the like. The CQI type need not be a ratio, but can be some other metric, such as, a Frame Error Rate (FER), a symbol error rate (SER), a Packet Error Rate (PER), a Bit Error Rate (BER), and the like.

The base station may receive the signals at the base station receiver and couple the CQI values to a coordinated DL zone manager for interference analysis. The base station proceeds to block 620 and compares the one or more CQI values corresponding to the one or more CQI types to one or more thresholds. For example, each CQI type can have one or more associated threshold against which the received CQI values are compared.

The base station proceeds to decision block 630 and determines, based on the CQI values and the threshold comparisons, whether the subscriber station is interference limited. If not, the base station returns to block 610 to process further CQI values. If the base station determines, at decision block 630, that the subscriber station is interference limited, the base station proceeds to decision block 542.

At decision block 642 the base station determines if the modulation coding scheme for the subscriber station is variable and if such variation may improve the signal quality at the subscriber station. For example, the base station and subscriber station may support multiple modulation coding schemes, and the channel quality may degrade performance of a high order modulation coding scheme. The base station may determine that the subscriber station is better served using a more robust modulation coding scheme and may initially attempt to improve signal quality through modification of a modulation coding scheme before assigning the subscriber station to a coordinated DL zone.

If the subscriber station supports a more robust modulation coding scheme, the base station proceeds from decision block 642 to block 644, where the base station updates the selected or otherwise active modulation coding scheme for the subscriber station to a more robust modulation coding scheme. The base station returns from block 644 to block 610 to process further CQI values.

If, at decision block 642, the base station determines that the subscriber station does not support multiple modulation coding schemes, or that the presently active modulation coding scheme for the subscriber station is supported by a coordinated DL zone, the base station proceeds to decision block 650.

At decision block 650, the base station determines if the subscriber station is already assigned to a coordinated DL zone. If so, assigning the subscriber station to a different coordinated DL zone may not improve the signal quality to the subscriber station. The base station proceeds back to block 610 to process further CQI values without making any change.

If, at decision block 650, the base station determines that the subscriber station is not already assigned to a coordinated DL zone, the base station proceeds to block 660 and assigns the subscriber station to a coordinated DL zone. The base station may assign the subscriber station to a coordinated DL zone by examining a used subchannel bit map to determine available resources within a coordinated DL zone. The base station may select from open subchannels and may allocate downlink resources to the subscriber station within a selected set of open subchannels within the coordinated DL zone. The base station returns to block 610 after updating the resource allocation assignment.

The wireless communication system can be, for example, an OFDMA wireless communication standard operating in accordance with an IEEE 802.16 standard. The standard can be modified to support intercell interference mitigation as described herein with little to no effect on legacy devices.

As described above, in order to provide adequate support to aid the implementations of the interference mitigation schemes, the wireless communication system can implement a coordinated downlink (DL) zone, which is a DL zone coordinated between the servicing base station (BS) and all its neighbor BSs, including, without limitation, the following features:

1. substantially the same zone boundary;
2. the same zone permutation type, e.g., PUSC (partial usage of subchannels), STC PUSC (space time coding partial usage of subchannels), AMC (adaptive modulation and coding), STC AMC (space time coding adaptive modulation and coding), and FUSC (full usage of subchannels).

In such a coordinated DL zone, the same zone boundary and the same zone permutation type allow for the interference to be stable, and also allow the interference properties of the neighbor BSs to be learned by using pilot subcarriers, as the pilot subcarriers from all neighbor BSs are transmitted at the same time and the same time and frequency locations. By gaining the knowledge of the interference properties from all neighbor BSs, the interference mitigation schemes can be effectively implemented.

A frame can have zero, one, or multiple coordinated DL zones. In one embodiment, the first PUSC zone can also be a coordinated DL zone.

A number of permutation types, such as PUSC, STC-PUSC, AMC, STC-AMC, and FUSC, are allowed to be used in a coordinated DL zone. Each permutation type can have zero or one coordinated zone in a frame, except for the PUSC. For the PUSC, in addition to the first DL PUSC zone, there can be other coordinated DL PUSC zones.

To enable the interference mitigation schemes based on the coordinated DL zone concept, supports are needed at air interface to signal the presence of such coordinated DL zones and some PHY properties. The 802.16 Rev2/D3 specification may be adapted or otherwise modified in order to provide support for coordinated DL zone based signaling. For example, the current 802.16 Rev2/D3 specification may be amended by:

1. include a (type/length/value) TLV in a subscriber station basic capability request (SBC-REQ) and the complementary subscriber station basic capability response (SBC-RSP) messages to signal the BS's support for the coordinated DL zones and subscriber station interference cancellation capability in the coordinated DL Zones;
2. include a TLV in a downlink channel descriptor (DCD) message to signal the presence and type of a Coordinated DL zone;
3. use a currently reserved bit in the DL zone switch information element (IE) to signal that the zone is a Coordinated DL zone;
4. include a TLV in a MOB_NBR-ADV message for each neighbor BS to specify its DL_PermBase and PRBS_ID.

In summary, a few minor and backward compatible changes may be implemented to the 802.16 Rev2/D3 standard to support the implementation of interference mitigation schemes using coordinated DL zones described herein.

Methods and apparatus are described herein for intercell interference mitigation in a wireless communication system.

As used herein, the term coupled or connected is used to mean an indirect coupling as well as a direct coupling or connection. Where two or more blocks, modules, devices, or apparatus are coupled, there may be one or more intervening blocks between the two coupled blocks.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosed embodiments. Various modifications to these embodiments will be readily apparent to those of ordinary skill in the art, and the generic principles defined herein may be applied to other embodiments without departing from the scope of the disclosure.

What is claimed is:

1. A method of intercell interference mitigation, the method comprising:
- synchronizing a downlink resource allocation zone across a plurality of base stations;
- receiving a channel quality indicator (CQI) value from a subscriber station;
- coordinating a same resource permutation type across the plurality of base stations in the downlink resource allocation zone based on the received CQI, wherein coordinating the same resource permutation type includes transmitting a first message indicating a permutation base associated with the same resource permutation type and a second message indicating a pseudo random binary sequence identifier associated with the same resource permutation type to the plurality of base stations; and
- allocating downlink resources to the subscriber station in the downlink resource allocation zone based on the same resource permutation type.

2. The method of claim 1, further comprising inhibiting multiple-input-multiple-output (MIMO) operation for downlink resource allocations occurring in the downlink resource allocation zone.

3. The method of claim 1, further comprising inhibiting assignment of dedicated pilot channels in the downlink resource allocation zone.

4. The method of claim 1, further comprising coordinating a used subchannel bitmap across the plurality of base stations.

5. The method of claim 1, wherein synchronizing the downlink resource allocation zone comprises synchronizing the downlink resource allocation zone across base stations of the plurality of base stations utilizing a same downlink operating frequency band.

6. The method of claim 5, wherein the plurality of base stations utilizing the same downlink operating frequency band comprise base stations of the plurality of base stations supporting adjacent coverage areas.

7. The method of claim 1, wherein synchronizing the downlink resource allocation zone comprises synchronizing an allocation time and a subset of subcarriers of a plurality of Orthogonal Frequency Division Multiple Access (OFDMA) frames.

8. The method of claim 1, wherein coordinating the same resource permutation type comprises:
- querying the subscriber station for a resource permutation type capability;
- determining a supported resource permutation type in response to the querying; and
- allocating the subscriber station a resource permutation in the downlink resource allocation zone based on the supported resource permutation type.

9. The method of claim 1, wherein coordinating the same resource permutation type comprises permuting a number of subcarriers of a multiple carrier modulation scheme based on a same resource permutation type.

* * * * *